(12) United States Patent
Merchant et al.

(10) Patent No.: US 6,607,099 B2
(45) Date of Patent: *Aug. 19, 2003

(54) AIR DRIVE SYSTEM

(75) Inventors: Bhavesh Merchant, Burlington, NJ (US); Francesco Rosselli, Gloucester, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/969,356

(22) Filed: Oct. 2, 2001

(65) Prior Publication Data
US 2002/0079328 A1 Jun. 27, 2002

Related U.S. Application Data

(63) Continuation-in-part of application No. 09/466,382, filed on Dec. 17, 1999, now Pat. No. 6,321,946.

(51) Int. Cl.[7] .................................................. B67D 5/52
(52) U.S. Cl. ................... 222/135; 222/145.4; 222/255; 222/288; 222/334
(58) Field of Search ................................. 222/134, 135, 222/252, 254, 255, 256, 263, 265, 267, 275, 288, 334, 145.1, 145.4, 145.5, 145.6, 147.7

(56) References Cited

U.S. PATENT DOCUMENTS

| | | | | |
|---|---|---|---|---|
| 3,818,930 A | * | 6/1974 | Crum et al. | 137/341 |
| 4,516,700 A | * | 5/1985 | Guzowski | 222/330 |
| 4,778,631 A | * | 10/1988 | Cobbs et al. | 261/128 |
| 6,321,946 B1 | * | 11/2001 | Merchant | 222/135 |

* cited by examiner

*Primary Examiner*—Ehud Gartenberg
*Assistant Examiner*—Patrick Buechner
(74) *Attorney, Agent, or Firm*—Pitney, Hardin, Kipp & Szuch LLP

(57) ABSTRACT

A two-component resin or adhesive dispensing system including an air drive motor with adjustable settings which drives, by means of sprocket and chain drive systems, an activator metering pump and an adhesive metering pump as to provide a dispenser with adjustable amounts of activator material and adhesive material. The metering pumps are mounted upon adjustably movable mounting brackets such that their relative disposition may be readily altered so as to accommodate different sized sprocket members which will then alter the drive output of the metering pumps in order to change the ratio of activator material dispensed with respect to the amount of resin or adhesive material dispensed.

20 Claims, 5 Drawing Sheets

AIR DRIVE SYSTEM

RELATED APPLICATION

This application is a continuation-in-part of application Ser. No. 09/466,382, filed Dec. 17, 1999, now U.S. Pat. No. 6,321,946, and is hereby incorporated by reference.

BACKGROUND OF THE INVENTION

1. Field of the Invention

The present invention relates generally to resin or adhesive dispensing systems, and more particularly to an air powered resin or adhesive dispensing system wherein the relative amount of a resin or an adhesive and activator material to be dispensed can be readily and easily changed by varying the output of an air drive motor where a desired ratio of resin or adhesive with respect to its associated activator is also being achieved based on an operating relationship of the material pumping equipment and the air drive motor.

2. Brief Description of the Prior Art

Equipment for dispensing high viscosity adhesives has been a challenge for the users of structural adhesives for many years. The available options for accomplishing this task were supplied by standard equipment manufacturers producing machines that were designed to pump a wide range of products. The equipment consisted of slave arm piston pumps, or piston pump hydraulic systems with metering pumps that were belt or electric driven. The disadvantage of the slave arm piston pump for 10:1 products was their inability to reliably supply adhesive and activation at the correct ratios. The machines driven by electric motors produced more consistent mix ratios, but the electric motor, which was typically not explosion proof, could not be used in facilities where flammables were used.

Successively, two part or multi-component dispensing systems specifically for dispensing resins, adhesives, acrylic materials, urethanes, and the like are currently marketed by various manufacturers, such as, for example, EMC$^2$ of Sterling Heights, Mich.; GS Manufacturing of Costa Mesa, Calif.; and Ashby Cross Company, Inc. of Topsfield, Mass. While these two part or multi-component systems can be satisfactory from an operational point of view, several operational disadvantages commonly characteristic of such systems do exist.

For example, most of the known multi-component dispensing systems comprise a drive motor operatively connected to a pair of metering pumps which serve to dispense, for example, an adhesive material and an associated activator. In accordance with a first well-known type of system, however, the metering pumps are usually driven by means of a driving gear mounted upon the drive motor. Consequently, if it is desired to change or alter the relative outputs, amounts, or ratios of the adhesive or activator components being dispensed, due for example to the fact that a different proportion or ratio of the resin or adhesive material with respect to its associated activator is required to be used as a result of the use of different adhesives in connection with different applications, or as a result of the use of particular resins or adhesives under different operating or ambient temperature conditions, the conventional dispensing systems cannot readily accommodate or achieve such alterations or changes without major changes or alterations to the drive motor and metering pump assemblies. In particular, for example, the size of the drive motor driving gear, or the size of the metering pump driven gears enmeshed with the drive motor driving gear, cannot be readily changed or altered because the drive motor and metering pumps are mounted at relatively fixed positions with respect to each other. Accordingly, changing the size of the various driving or driven gears alters the center-to-center distances defined between the driving and driven gears which cannot be physically accommodated within the system.

In accordance with a second known type of system, the metering pumps are operatively driven by the drive motor through means of a suitable chain drive mechanism or system. However, again, in order to alter or change the output drive of the metering pumps, the various sprocket components, chains, idlers, and the like need to be changed which is quite time-consuming and results in a substantially expensive amount of system down-time.

In addition, it is also important that the resin or adhesive metering pump and the activator metering pump be able to be separately or independently operated or driven by means of the drive motor. There are several reasons for this requirement. Firstly, it is important to operate the metering pumps separately or independently in order to properly calibrate or test the pumps so as to ensure, for example, that each pump is dispensing the desired amount of material. Along these lines, it is important to be able to calibrate the metering pumps separately or independently in order not to waste material which would therefore be dispensed by means of the other metering pump not being calibrated or tested.

Secondly, in a similar manner, if one of the metering pumps develops, experiences, or exhibits an operational problem, it is again important from the viewpoint of being able to conserve resources or materials to be able to service or perform required maintenance upon such inoperative metering pump without having to operate or run the operative metering pump. In accordance with the conventional chain-driven drive motor and metering pump systems, however, such separate or independent operation of the metering pumps is not possible because both metering pumps are driven by the drive motor in a serial manner. In other words, the driving arrangement is such that the drive motor is operatively connected to a first one of the metering pumps so as to drive such metering pump, and such first metering pump is then in turn operatively connected to the second metering pump. Consequently, in view of the fact that both of the metering pumps are not directly driven by the drive motor but, to the contrary, the second metering pump is driven by the first metering pump, both metering pumps are not able to be separately or independently driven by the drive motor. If the second metering pump is to be driven or operated, then the first metering pump must also be driven or operated.

In U.S. application Ser. No. 09/466,382 filed Dec. 17, 1999 by Merchant, a resin or adhesive dispensing system is disclosed which comprises a hydraulic drive motor, an adhesive metering pump disposed upon a first side of the drive motor, and an activator metering pump disposed upon a second side of the drive motor. The drive motor and metering pumps comprise sprocket members such that the chain drives respectively interconnecting the drive motor sprocket and the metering pump driven sprockets enable the hydraulic drive motor to independently drive the adhesive and activator metering pumps.

However, there is a desire to provide an improved resin or adhesive dispensing system wherein the speed of the drive motor can be varied by air pressure provided by a localized air regulator, such that the varying speed of the air drive motor allows an adjustable output in a range of high and low settings, adding versatility to operation and reduction of required equipment compared to the resin or adhesive dispensing system achieved by U.S. application Ser. No. 09/466,382.

OBJECTS OF THE INVENTION

Accordingly, it is an object of the present invention to provide a new and improved resin or adhesive dispensing system.

A further object of the present invention is to provide a new and improved resin or adhesive dispensing system which effectively overcomes the various operational disadvantages or drawbacks characteristic of the prior art or conventional dispensing systems.

A still further object of the present invention is to provide a new and improved resin or adhesive metering system in which the amount of resin or adhesive dispensed may be adjusted during operation.

A still further object of the present invention is to provide a new and improved resin or adhesive dispensing system wherein the relative amount of a resin or an adhesive to be dispensed, with respect to its associated activator, can be readily and easily changed or altered depending upon the particular resin or adhesive being dispensed, the operating or ambient temperature conditions, or the like, such that a predeterminedly desired ratio of resin or adhesive with respect to its associated activator is achieved.

A still further object of the present invention is to provide a new and improved resin or adhesive dispensing system wherein the adhesive or resin and activator metering pumps are capable of being separately and independently driven by means of the drive motor such that one of the metering pumps can be separately and independently calibrated, serviced, and maintained without operating the other metering pump such that resin, adhesive, or activator materials are not needlessly wasted.

A still further object of the present invention is to provide an improved resin or adhesive dispensing system with reduced maintenance and repair requirements.

To attain the objects described, there is provided a new and improved resin or adhesive dispensing system which comprises a low to high output air-powered motor with adjustable settings, an adhesive metering pump disposed upon a first side of the drive motor, and an activator metering pump disposed upon a second side of the drive motor. This arrangement makes it easy to dispense adhesive or activator material independently while purging the machine with new product or during product changeover.

The drive motor and metering pumps comprise sprocket members such that chain drives respectively interconnecting the drive motor drive sprocket and the metering pump driven sprockets enable the air drive motor to independently drive the adhesive and activator metering pumps. In addition, the drive motor and metering pumps are mounted upon mounting brackets which are mounted upon a support platform of a portable cart so as to be laterally adjustable. In this manner, utilization of the laterally adjustable mounting brackets permit differentially sized sprocket members to be mounted, for example, upon the activator metering pump so as to alter the discharge or output amount of the activator pump relative to the output or discharge of the adhesive metering pump whereby the ratio of the activator with respect to the adhesive is able to be readily achieved.

DETAILED DESCRIPTION OF THE PREFERRED EMBODIMENTS

Figure 1:
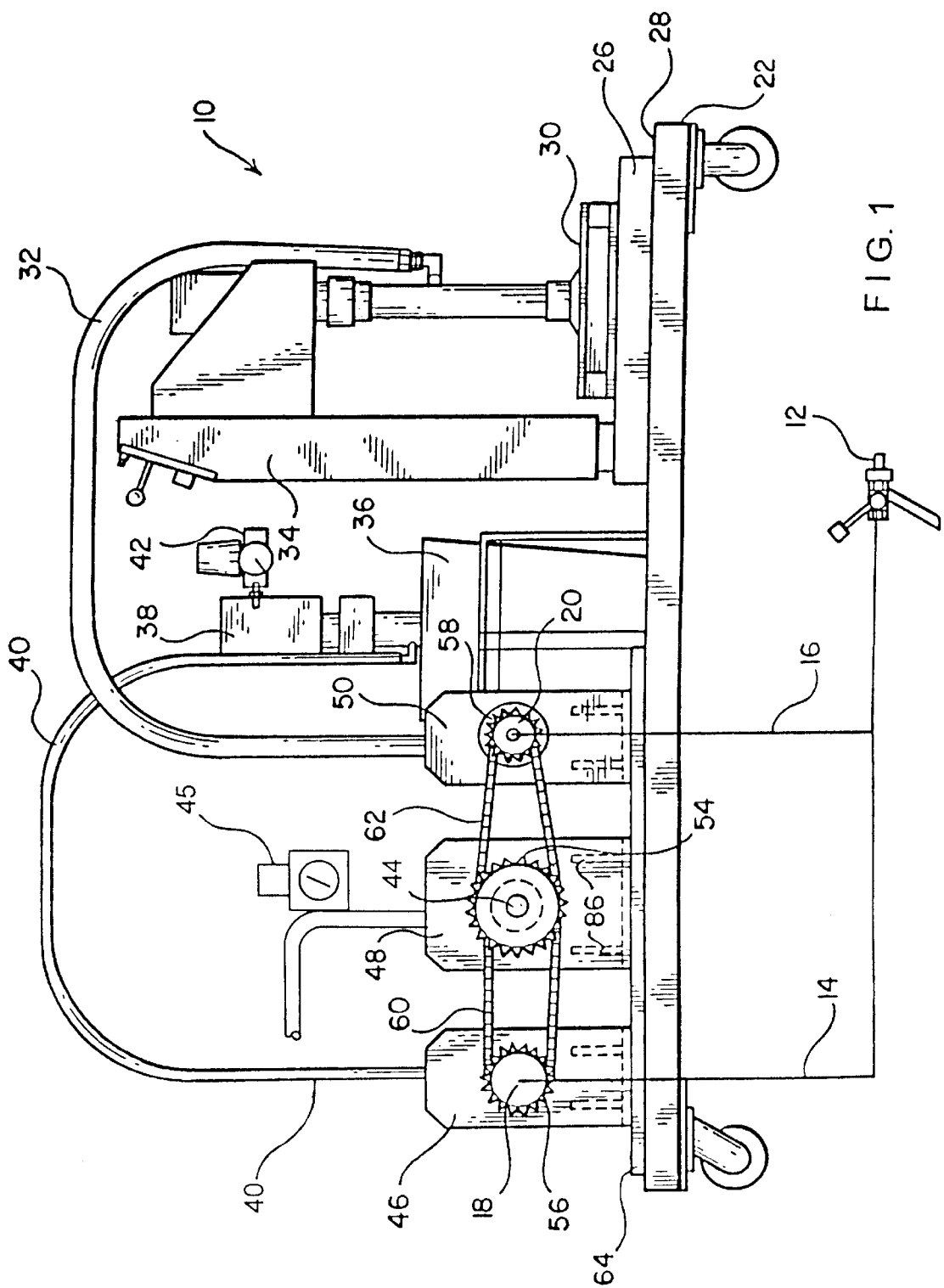
FIG. 1 is a side elevational, partially schematic view of the new and improved resin or adhesive dispensing system constructed in accordance with the principles and teachings of the present invention and illustrated as being mounted upon a portable cart.

Referring now to the drawings wherein like numerals refer to like elements throughout the several views, one sees that in FIG. 1 thereof the resin or adhesive system constructed in accordance with the principles and teachings of the present invention is illustrated therein and is generally indicated by the reference character 10. The resin or adhesive dispensing system 10 comprises a manually-operated dispensing gun 12; however, the resin or adhesive dispensing system may also be interfaced with robotic dispensing systems. Activator and resin or adhesive components of the material mixture to be dispensed are respectively supplied to the dispensing gun 12 through means of activator conduit 14 and adhesive conduit 16 which are fluidically connected to output ports of an activator metering pump 18 and an adhesive metering pump 20. All of the components of the dispensing system 10 are adapted to be supported or mounted upon a portable wheeled cart 22 such that the entire dispensing system 10 is rendered portable for use in various locations as may be desired or required.

More particularly, adhesive transfer pump 30 powered by compressed air is mounted upon a first support platform 26. When activated, the adhesive transfer pump 30 can pump or supply adhesive from a five-gallon pail or fifty-five gallon drum to the resin or adhesive metering pump 20 through means of adhesive transfer conduit 32. It is to be noted that the adhesive transfer pump 30 comprises an air-driven ball-check piston pump. For transfer from a five-gallon pail, adhesive transfer pump 30 is mounted on a single post ram. For transfer from a fifty-five gallon drum, adhesive transfer pump 30 is mounted on a double-post ram. Due to the high viscosity of adhesive, the adhesive needs assistance to be dispensed by the adhesive transfer pump 30. The single post ram for the five-gallon pail and the double post ram for the fifty-five gallon drum apply pressure via a plate helping the adhesive to be fed through adhesive transfer pump 30. A pressure setting between 40–50 psi is recommended for smooth transfer. Air pressure controls 34 are mounted upon adhesive transfer pump 30, for possible operation from an operator console.

A supply tank 36, for supplying the activator material to the activator material metering pump 18, is mounted upon the upper support surface 28 of the portable wheeled cart 22 and an activator transfer pump 38 is operatively associated with the supply tank 36. In this manner, similar to the operation of the adhesive transfer pump 30, when activated, the activator transfer pump 38 can pump or supply activator material from the supply tank 36 to the activator metering pump 18 through means of an activator transfer conduit 40. Air pressure controls 42 are also disclosed as being operatively associated with the activator transfer pump 38, and as was the case with the adhesive transfer pump 30, the activator transfer pump 38 comprises an air-driven ball-check piston pump. Further details of such transfer pumps are therefore omitted herefrom as not being necessary for the appreciation and understanding of the invention.

In accordance with one of the primary features characteristic of the present invention, the activator metering pump 18 and the adhesive metering pump 20 are adapted to be driven by means of an air drive motor 44. The high torque air drive motor 44 is powered by compressed air from an outside air manifold (shown in FIG. 12), or any other suitable pressurized air source, with the speed of air drive motor 44 regulated by adjustment of air regulator 45. Changing the air pressure changes the amount of final adhesive output from dispensing gun 12. The attachment of air drive motor 44 allows interchangeability between low or high output motors.

As best seen in FIG. 1, the air drive motor 44 is interposed between the activator metering pump 18 and the adhesive metering pump 20 such that both the activator metering pump 18 and the adhesive metering pump 20 are turned directly by the air drive motor 44 through a chain device.

Figure 2:
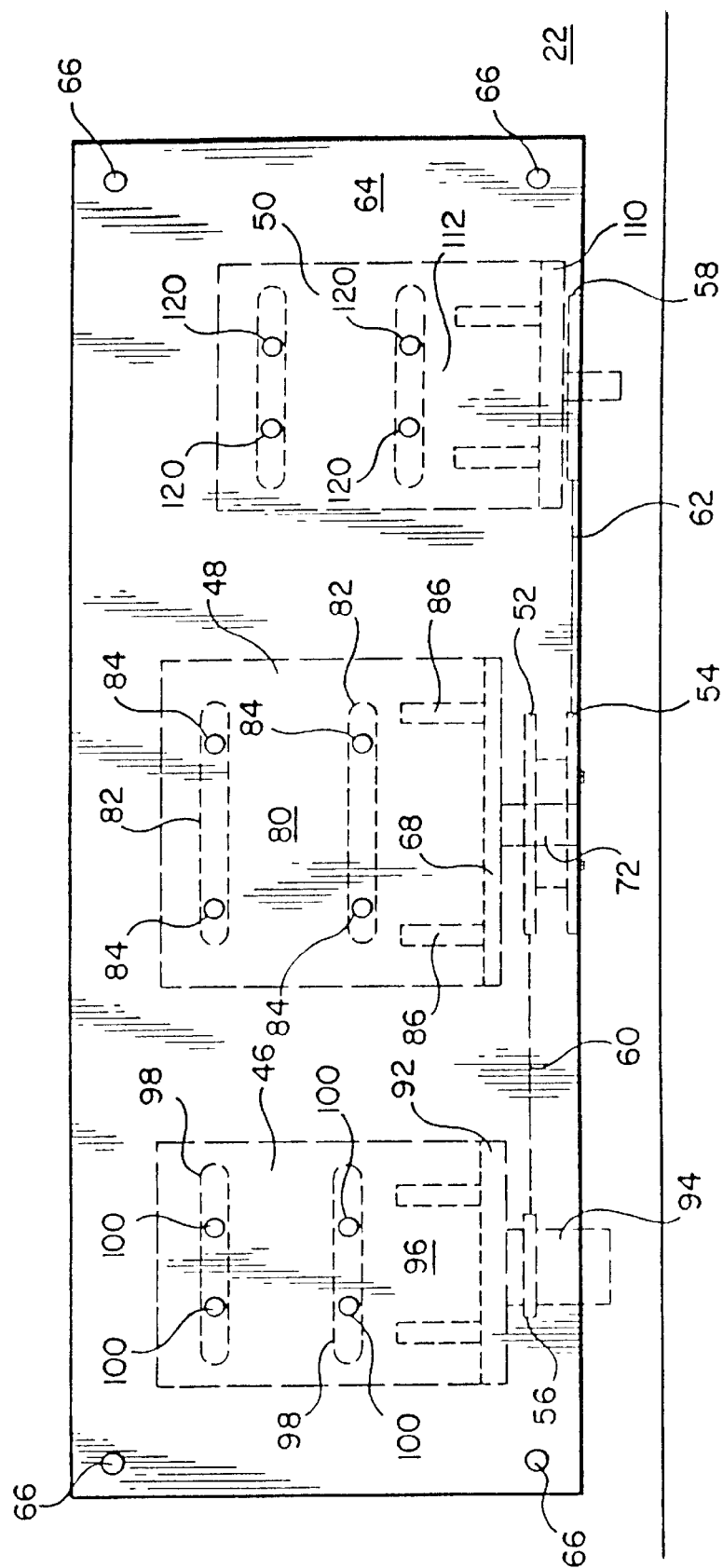
FIG. 2 is a top plan view of a support platform which is to be fixedly mounted upon the portable cart of the new and improved resin or adhesive dispensing system of the present invention for, in turn, mounting the support brackets for respectively mounting the air drive motor, the activator metering pump, and the adhesive metering pump, upon the support platform wherein the brackets, the motor, and the metering pumps are illustrated in phantom lines.
Figure 3:
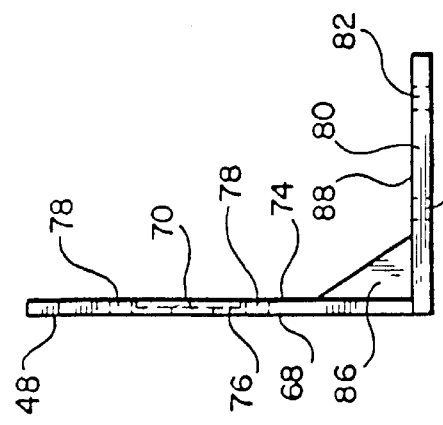
FIG. 3 is a front elevational view of the support bracket for mounting the high torque air drive motor of the new and improved resin or adhesive dispensing system illustrated in FIG. 1.
Figure 4:
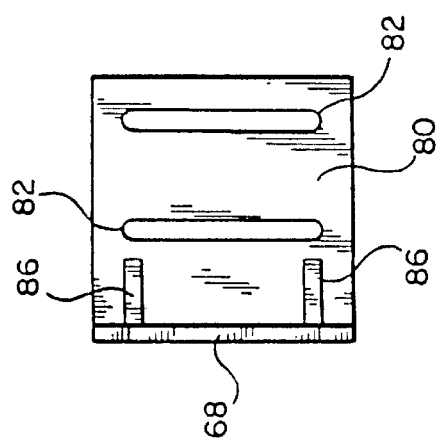
FIG. 4 is a top plan view of the air drive motor support bracket as illustrated in FIG. 3.
Figure 5:
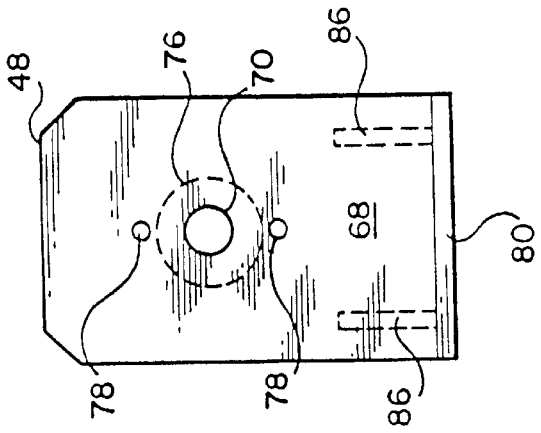
FIG. 5 is a side elevational view of the air drive motor support bracket as illustrated in FIGS. 3 and 4.
Figure 6:
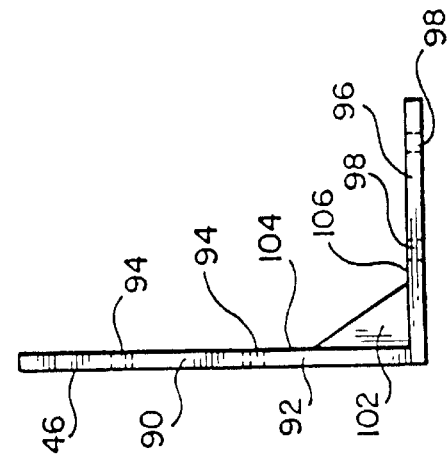
FIG. 6 is a front elevational view of the support bracket for mounting the activator metering pump of the resin or adhesive dispensing system illustrated in FIG. 1.
Figure 7:
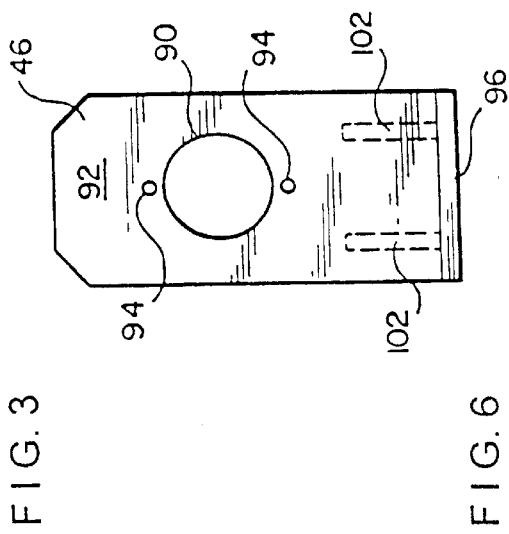
FIG. 7 is a side elevational view of the activator metering pump support bracket as illustrated in FIG. 6.
Figure 10:
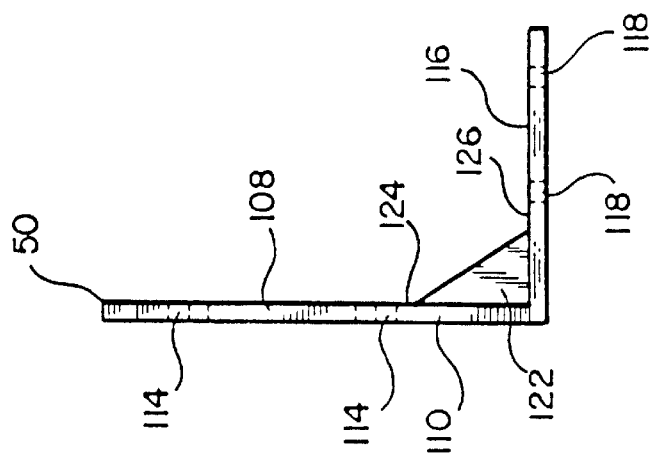
FIG. 10 is a side elevational view of the adhesive metering pump support bracket as illustrated in FIG. 9.

More particularly, with additional reference being made to FIGS. 2–11, it is seen that the activator metering pump 18, the air drive motor 44, and the adhesive metering pump 20 are respectively mounted upon mounting brackets 46, 48, 50 which have substantially L-shaped cross-sectional configurations as best seen in FIGS. 5, 7, and 10. In addition, as best seen in FIG. 2, the air drive motor 44 has a pair of axially spaced, externally toothed sprocket members 52,54 mounted thereon, and the activator metering pump 18 is likewise provided with an externally toothed sprocket member 56 while the adhesive metering pump 20 is similarly provided with an externally toothed sprocket member 58. Drive chains 60,62 are also provided for respectively interconnecting the activator metering pump sprocket member 56 and the adhesive metering pump sprocket member 58 to the air drive motor sprocket members 52 and 54.

In this manner it can be appreciated that either one or both of the activator material or the resin or adhesive material metering pumps 18,20 can be separately or independently driven, or driven together, by means of the air drive motor 44 as a result of the selective connection or disconnection of the drive chains 60,62 between the sprocket members 56,58 of the activator and adhesive metering pumps 18,20 and the sprocket members 52,54 of the air drive motor 44. Driving of the two activator and adhesive metering pumps 18,20 in combination with each other is of course desired in order to provide the dispensing gun 12 with the appropriate activator and resin or adhesive mixture ratio, while separate or independent driving of the activator and adhesive metering pumps 18,20 is desirable when, for example, calibration, maintenance, start-up, and other similar servicing operations are necessarily being performed upon only one of the metering pumps such that material from the other metering pump is not unnecessarily wasted.

Continuing further, and with reference still being made of FIGS. 1–11, another primary feature characteristic of the present invention resides in the fact that as a result of the particular aforenoted arrangement or disposition of the activator and adhesive metering pumps 18,20 with respect to the air drive motor 44, if it should be desired to alter the particular ratio of the activator material with respect to the resin or adhesive material, such an alteration, adjustment, or the like is readily achievable by changing, for example, the sprocket member 56 mounted upon the activator metering pump 18. For example, a particular activator metering pump sprocket member 56 has a predetermined number of teeth integrally formed thereon, and it may be replaced by or exchanged with another sprocket member which has a different predetermined number of teeth integrally formed thereon. In this manner, when the activator and adhesive metering pump sprocket members 56,58 are rotated by means of the air drive motor sprocket members 52,54 through means of the drive chains 60,62, the rotational output of activator metering pump sprocket member 56 will have been altered or changed, as a result of the different number of external teeth integrally formed thereon, whereby the material dispensing output of the activator metering pump 18 will have been correspondingly altered or changed.

In order to achieve the particular replacement or exchange of the sprocket member 56 mounted upon the activator metering pump 18, as well as to similarly replace the sprocket members 52,54,58 respectively mounted upon the adhesive metering pump 20 and the air drive motor 44, and in order to provide for the relative lateral movement of the activator and adhesive metering pumps 18,20, and the air drive motor 44, with respect to each other as may be required attendant the replacement or exchange of the various sprocket members 52,54,56,58 of the air drive motor 44, the activator metering pump 18, and the adhesive metering pump 20, the mounting brackets 46,48,50 respectively mounting the activator metering pump 18, the air-powered drive motor 44, and the adhesive metering pump 20, are mounted upon a second support platform 64 so as to be laterally adjustable thereon. The second support platform 64 is affixed to the portable wheeled cart 22 by means of suitable bolt fasteners or the like 66, as best seen in FIG. 2, and the mounting brackets 46,48,50 are mounted upon the second support platform 64 so as to be slidably adjustable thereon in opposite lateral directions.

More particularly, with additional reference being made to FIGS. 3–11, and as has been noted hereinbefore, each one of the mounting brackets 46,48,50 has a substantially L-shaped configuration in cross-section comprising a vertically disposed leg or section and a horizontally disposed leg or section. In connection, for example, with the mounting bracket 48 for the air drive motor 44, as best seen in FIGS.

3–5, the vertically disposed leg or section 68 of the mounting bracket 48 is provided with a central bore 70 through which projects an output shaft 72 of the air drive motor 44, and the rear face 74 of the vertical leg or section 68 is provided with a counterbored portion 76 concentrically disposed about the central bore 70 for mounting the front face of the air drive motor 44. The sprocket members 52,54 are mounted upon the forward end of the output shaft 72 of the air drive motor 44 so as to be disposed forwardly of the vertically disposed leg or section 68 of the mounting bracket 48. Apertures 78 are also provided upon the vertical leg or section 68 of the mounting bracket 48 for receiving suitable fasteners, not shown, by means of which the air drive motor 44 is fixedly secured upon the vertical leg or section 68 of the mounting bracket 48.

The air drive motor mounting bracket 48 further comprises a horizontally disposed leg or section 80 within which a pair of laterally disposed slots 82,82 are defined. Suitable fasteners 84, as seen in FIG. 2, are adapted to pass through the slots 82,82 and into threaded bores, not shown, defined within the support platform 64 such that when the fasteners 84 are loosened, the lateral disposition of the air drive motor mounting bracket 48 may be laterally adjusted whereas when the fasteners 84 are tightened, the lateral disposition of the air drive motor mounting bracket 48 is fixed with respect to the support platform 64. In this manner, the exchange or replacement of particular sprocket members can be readily achieved and accommodated as a result of the relative disposition of the metering pump and air drive motor mounting brackets 46,48,50 and the metering pumps 18,20 and the air drive motor 44 mounted thereon, the positional adjustments of the metering pump and air drive motor mounting brackets 46,48,50 with respect to each other, and the disengagement and re-engagement of the drive chains 60,62 between the air drive motor 44 and the metering pumps 18,20 as permitted by such positional adjustments of the metering pump and air drive motor mounting brackets 46,48,50. A pair of triangular shaped weldments 86,86 are respectively affixed to the rear face 74 of the vertically disposed leg or section 68 of the mounting bracket 48 as well as to the upper surface 88 of the horizontally disposed leg or section 80 of the mounting bracket 48 so as to provide the requisite rigidity and strength to the mounting bracket 48.

Figure 8:
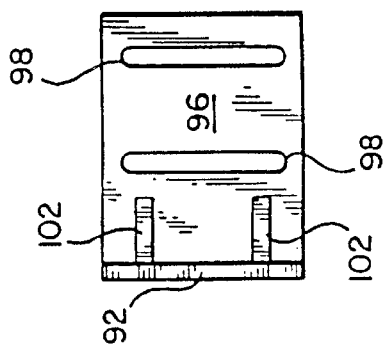
FIG. 8 is a top plan view of the activator metering pump support bracket as illustrated in FIGS. 6 and 7.

With specific reference now being made to FIGS. 6–8, the mounting bracket 46 for the activator metering pump 18 is shown and it is seen that the mounting bracket 46 is quite similar to the mounting bracket 48 for the air drive motor 44 with the major exceptions being the fact that the mounting bracket 46 for the activator metering pump 18 is not provided with a counterbored region as is the air drive motor mounting bracket 48, and the fact that a relatively large aperture 90 is defined within the vertically disposed leg or section 92 of the mounting bracket 46 so as to permit the rotary shaft 94 of the activator metering pump 18 to extend therethrough. The sprocket member 56 is mounted upon a forward region of the rotary shaft 94 of the activator metering pump 18 so as to be disposed forwardly of the vertically disposed leg or section 92 of the mounting bracket 46.

In a manner similar to the air drive motor mounting bracket 48, apertures 94 are also provided upon the vertically disposed leg or section 92 of the mounting bracket 46 for receiving suitable fasteners, not shown, by means of which the activator metering pump 18 is fixedly secured upon the vertically disposed leg or section 92 of the mounting bracket 46. The activator metering pump mounting bracket 46 further comprises a horizontally disposed leg or section 96 within which a pair of laterally disposed slots 98,98 are defined. Suitable fasteners 100, as may be seen in FIG. 2, are adapted to pass through the slots 98,98 and into threaded bores, not shown, defined within the support platform 64 such that when the fasteners 100 are loosened, the activator metering pump mounting bracket 46 may be laterally adjusted, whereas when the fasteners 100 are tightened, the lateral disposition of the activator metering pump mounting bracket 46 is fixed with respect to the support platform 64. A pair of triangular shaped weldments 102,102 are respectively affixed to the rear face 104 of the vertically disposed leg or section 92 of the mounting bracket 46 as well as to the upper surface 106 of the horizontally disposed leg or section 96 of the mounting bracket 46 so as to provide the requisite rigidity and strength to the mounting bracket 46.

Figure 11:
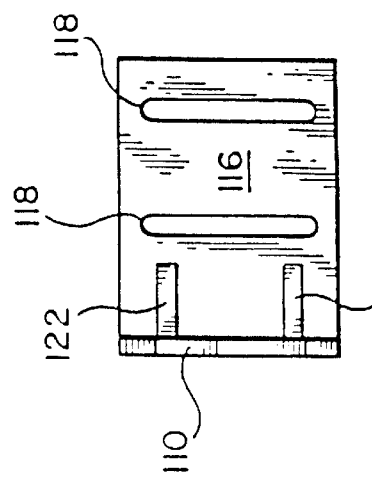
FIG. 11 is a top plan view of the adhesive metering pump support bracket as illustrated in FIGS. 9 and 10.
Figure 9:
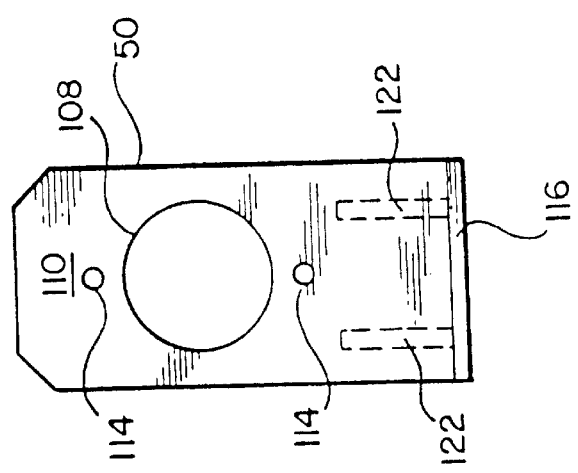
FIG. 9 is a front elevational view of the support bracket for mounting the adhesive metering pump of the resin or adhesive dispensing system illustrated in FIG. 1.

With reference now being made to FIGS. 9–11, the adhesive metering pump mounting bracket 50 is illustrated and shown therein, and it will be appreciated that the adhesive metering pump mounting bracket 50 is essentially or substantially the same as the activator metering pump mounting bracket 46 except for the precise sizes or dimensions of the various components thereof. More particularly, therefore, it is seen that a relatively large aperture 108 is defined within the vertically disposed leg or section 110 of the mounting bracket 50 so as to permit the rotary shaft 112 of the adhesive material metering pump 20 to extend therethrough. The sprocket member 58 is mounted upon a forward region of the rotary shaft 112 of the adhesive metering pump 20 so as to be disposed forwardly of the vertically disposed leg or section 110 of the mounting bracket 50. In a manner similar to the air-powered drive motor mounting bracket 48, as well as the activator metering pump mounting bracket 46, apertures 114 are also provided upon the vertically disposed leg or section 110 of the mounting bracket 50 for receiving suitable fasteners, not shown, by means of which the adhesive metering pump 20 is fixedly secured upon the vertically disposed leg or section 110 of the mounting bracket 50. The adhesive metering pump mounting bracket 50 further comprises a horizontally disposed leg or section 116 within which a pair of laterally disposed slots 118,118 are defined. Suitable fasteners 120, as may be seen in FIG. 2, are adapted to pass through the slots 118,118 and into threaded bores, not shown, defined within the support platform 64 such that when the fasteners 120 are loosened, the resin or adhesive material metering pump mounting bracket 50 may be laterally adjusted, whereas when the fasteners 120 are tightened, the lateral disposition of the adhesive metering pump mounting bracket 50 is fixed with respect to the support platform 64. A pair of triangular shaped weldments 122,122 are respectively affixed to the rear face 124 of the vertically disposed leg or section 110 of the mounting bracket 50 as well as to the upper surface 126 of the horizontally disposed leg or section 116 of the mounting bracket 50 so as to provide the requisite rigidity and strength to the mounting bracket 50.

Figure 12:
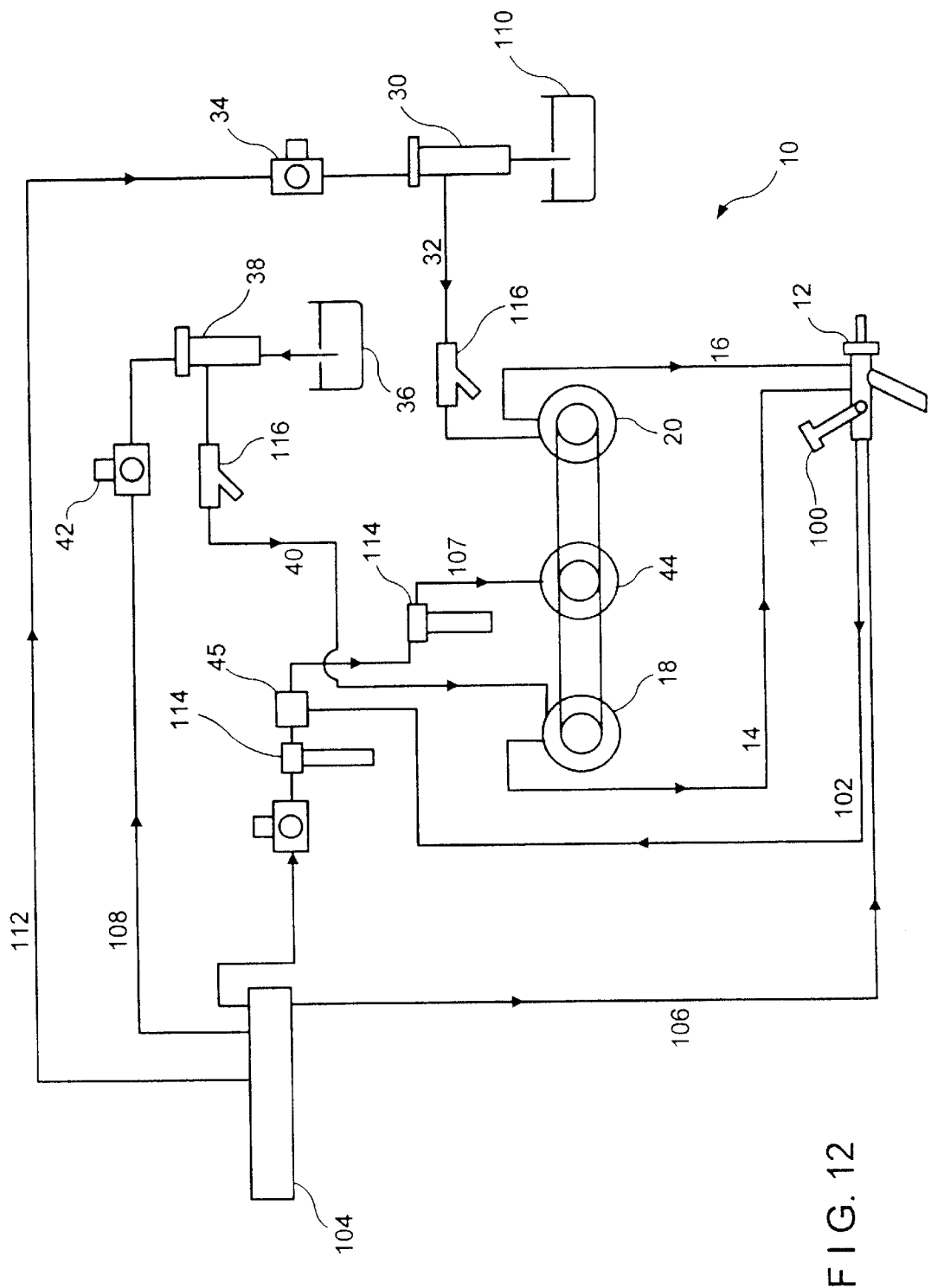
FIG. 12 is a fluidic circuit and equipment diagram illustrating the various pneumatic control lines and equipment operatively associated or utilized with the resin or adhesive dispensing system as illustrated in FIG. 1.

Turning lastly to FIG. 12, there is disclosed a fluidic circuit and equipment diagram which discloses and illustrates still another primary feature characteristic of the resin or adhesive dispensing system 10 characteristic of the present invention. More particularly, it will be appreciated that in accordance with the arrangement and utilization of the particular components parts comprising the new and improved adhesive dispensing system 10, the various powered components of the system 10 are pneumatic. This enables the use of manufacturing plant air, which is readily available and plentiful as a source of power, and eliminates the use of hydraulic components which normally requires a substantial amount of components for a hydraulic powered resin or adhesive dispensing system and eliminates the need for electrically powered motor drive components which can sometimes have the potential to explode and are hazardous to use within plant environments.

With reference then being made to FIG. 12, the resin or adhesive dispensing system 10 of the present invention is seen to comprise an air drive motor 44. Air drive motor 44 is operatively coupled to the activator metering pump 18 and the adhesive metering pump 20. When trigger valve 100 of dispensing gun 12 is opened, an air signal through air signal conduit 102 is sent to air regulator 45. Pressurized air for the air signal is provided via dispensing gun 12 by air manifold 104 or an external pressurized air source through conduit 106. Adjusting the flow of adhesive can be accomplished by adjusting air regulator 45, with the adjustment reflected in the opening and closing of air regulator 45 caused by the air signal. Upon receiving the air signal, air regulator 45 opens completely to allow pressurized air from air manifold 104 or an alternative exterior air source through conduit 107 to activate air drive motor 44. Air drive motor 44 in a simultaneous manner then drives activator metering pump 18 and adhesive metering pump 20.

Activator metering pump 18 then pumps a proper amount of activator material for mixing with adhesive or resin material to dispensing gun 12 by activator conduit 14. Activator metering pump 18 is supplied with activator material through activator transfer conduit 40 by activator transfer pump 38. Activator transfer pump 38 draws its activator material supply from supply tank 36. The output of activator transfer pump 38 is regulated by air pressure controls 42 which control the amount of pressurized air through conduit 108 from air manifold 104 or an external pressurized air source to drive the activator transfer pump 38.

Adhesive metering pump 20 acts simultaneous with activator metering pump 18. Adhesive metering pump 20 pumps a proper amount of PLEXIS methacrylate adhesive or suitable equivalent for mixing with activator material to dispensing gun 12 through adhesive conduit 16. Adhesive metering pump 20 is supplied with adhesive or resin material through adhesive transfer conduit 32 by adhesive transfer pump 30. Adhesive transfer pump 30, depending on the model of pump used, draws its supply from either a five-gallon or a fifty-five gallon container 110. The output of adhesive transfer pump 30 is regulated by air pressure controls 34 at a localized operator station. Air pressure controls 34 regulate the amount of pressurized air through air conduit 112 to drive adhesive transfer pump 30.

Auxiliary items such as filter elements 114 and strainers 116 are provided for the filtration of adhesive or resin material, activator material and/or pressurized air before such material or air enters operating equipment of the adhesive or resin dispensing system.

Thus, it may be seen that in accordance with the principles and teachings of the present invention, a new and improved resin or adhesive material dispensing system has been provided and disclosed. The new and improved resin or adhesive dispensing system enables the activator and adhesive metering pumps to be separately or independently driven by or from the air drive motor with varying output which is important for calibration, servicing, and maintenance operations as well as versatility during dispensing operations. The activator and adhesive metering pumps, as well as the air drive motor, are mounted upon laterally adjustable mounting brackets so as to facilitate the exchange or replacement of different sized sprocket members operatively mounted upon the rotary shafts of the metering pumps and the air drive motor whereby different mixture ratios of the activator material with respect to the resin or adhesive material may be readily and simply achieved; and the air drive motor is driven by means by compressed air readily available in the manufacturing plant or facility such that electrically or hydraulically powered motor drives are rendered unnecessary and are eliminated.

Obviously, many variations and modifications of the present invention are possible in light of the above teachings. It is therefore to be understood that within the scope of the appended claims the present invention may be practiced otherwise than as specifically described herein.

We claim:

1. A two-component mixture dispensing system, comprising:
    a first metering pump for dispensing a first component of a two-component mixture;
    a second metering pump for dispensing a second component of said two-component mixture;
    an air drive motor for driving said first and second metering pumps;
    an air regulator operatively coupled to said air drive motor so as to vary the output of said air drive motor by regulating an air pressure to said air drive motor;
    drive chains operatively interconnecting said air drive motor to said first and second metering pumps for directly driving both of said first and second metering pumps by said air drive motor separately and independently with respect to the other one of said first and second metering pumps;
    a pair of axially spaced sprocket members are mounted upon said air drive motor;
    a first sprocket member is mounted upon said first metering pump;
    a second sprocket member is mounted upon said second metering pump; and
    said drive chains comprise a first drive chain operatively interconnecting a first one of said pair of axially spaced sprocket members mounted upon said air drive motor and said first sprocket member mounted upon said first metering pump, and a second drive chain operatively interconnecting a second one of said pair of axially spaced sprocket members mounted upon said air drive motor and said second sprocket member mounted upon said second metering pump.

2. The system as set forth in claim 1, wherein:
    said first and second metering pumps are mounted upon opposite lateral sides of said air drive motor.

3. The system as set forth in claim 2, further comprising:
    a source of high-pressure air comprising a pneumatic supply conduit fluidically connecting said source of high-pressure air to said air regulator for supplying pneumatic air from said source of high-pressure air to said air drive motor.

4. The system as set forth in claim 3, further comprising:
    an air manifold disposed within said pneumatic supply conduit fluidly connecting said source to said air regulator.

5. The system as set forth in claim 4, further comprising:
    a dispensing gun; and
    a pneumatic switch mounted upon said dispensing gun for opening and closing said pneumatic fluid supply conduit so as to terminate operation of said air drive motor as a result of activation of said air regulator where said air regulator is moved from an OPENED state to a CLOSED state, and to initiate operation of said air drive motor as a result of activation of said air regulator where said air regulator is moved from a CLOSED state to an OPEN state.

6. The system as set forth in claim 5, further comprising:

means for adjustably mounting at least one of said first and second metering pumps with respect to said air drive motor so as to accommodate different drive means for said at least one of said first and second metering pumps with respect to said air drive motor whereby different amounts of a first one of said first and second components of said two-component mixture, with respect to the second one of said first and second components of said two-component mixture, may be dispensed by said first and second metering pumps.

7. The system as set forth in claim 6, wherein said adjustable mounting means comprises:

a support platform; and at least one mounting bracket, upon which said at least one of said first and second metering pumps is mounted, movably mounted upon said support platform.

8. The system as set forth in claim 7, further comprising:

at least one slot defined within said at least one mounting bracket; and at least one fastener disposed within said slot and engaged with said support platform for permitting said at least one mounting bracket to be moved to a selected position when said at least one fastener is disposed in a loosened state with respect to said support platform, and for fixing said at least one mounting bracket at said selected position when said at least one fastener is disposed in a tightened state with respect to said support platform.

9. A two-component mixture dispensing system, comprising:

a first metering pump for dispensing a first component of a two-component mixture;

a second metering pump for dispensing a second component of said two-component mixture;

an air drive motor for driving said first and second metering pumps;

an air pressure regulator for controlling a speed of said air drive motor such that an output of said air drive motor can be varied for driving said first and second metering pumps;

drive chains operatively interconnecting said air drive motor to said first and second metering pumps for directly driving both of said first and second metering pumps by said air drive motor, and for driving each one of said first and second metering pumps by said air drive motor separately and independently with respect to the other one of said first and second metering pumps;

a pair of axially spaced sprocket members are mounted upon said drive motor;

a first sprocket member is mounted upon said first metering pump;

a second sprocket member is mounted upon said second metering pump; and said drive chains comprise a first drive chain operatively interconnecting a first one of said pair of axially spaced sprocket members mounted upon said drive motor and said first sprocket member mounted upon said first metering pump, and a second drive chain operatively interconnecting a second one of said pair of axially spaced sprocket members mounted upon said drive motor and said second sprocket member mounted upon said second metering pump; and means for adjustably mounting at least one of said first and second metering pumps with respect to said drive motor so as to accommodate different sprocket members for said at least one of said first and second metering pumps with respect to said drive motor whereby different amounts of a first one of said first and second components of said two-component mixture, with respect to the second one of said first and second components of said two-component mixture, may be dispensed by said first and second metering pumps.

10. A two-component mixture dispensing system, comprising:

a first metering pump for dispensing a first component of a two-component mixture;

a second metering pump for dispensing a second component of said two-component mixture;

an air drive motor for driving said first and second metering pumps;

a source of high pressure air comprising a pneumatic fluid conduit fluidically connecting said source of high-pressure air to said air drive motor for supplying high-pressure air from said source of high-pressure air to said air drive motor;

an air regulator disposed within said pneumatic fluid conduit so as to regulate an amount of high-pressure air driving said air drive motor by said high-pressure air transmitted by said source, said air drive motor operatively connected to said first and second metering pumps so as to, in turn, drive said first and second metering pumps when said air drive motor is operatively driven by said high-pressure air transmitted through said pneumatic fluid conduit such that an output of said first and second metering pumps is based on said regulated amount.

11. The system as set forth in claim 10, further comprising:

a dispensing gun; and a pneumatic switch mounted upon said dispensing gun for opening and closing said pneumatic fluid supply conduit so as to terminate operation of said air drive motor as a result of activation of said air regulator where said air regulator is moved from an OPENED state to a CLOSED state, and to initiate operation of said air drive motor as a result of activation of said air regulator where said air regulator is moved from a CLOSED state to an OPEN state.

12. The system as set forth in claim 11, further comprising:

means for adjustably mounting at least one of said first and second metering pumps with respect to said air drive motor so as to accommodate different drive means for said at least one of said first and second metering pumps with respect to said air drive motor whereby different amounts of a first one of said first and second components of said two-component mixture, with respect to the second one of said first and second components of said two-component mixture, may be dispensed by said first and second metering pumps.

13. A two-component mixture dispensing system comprising:
   a first metering pump for dispensing a first component of a two-component mixture;
   a second metering pump for dispensing a second component of said two-compartment mixture;
   an air drive motor for driving said first and second metering pumps;
   an air regulator pneumatically connected to said air drive motor by a pneumatic fluid conduit so as to drive said air drive motor by a regulated amount of pneumatic fluid transmitted by said air regulator through said pneumatic fluid conduit, said air drive motor operatively connected to said first and second metering pumps so as to, in turn, drive said first and second metering pumps when said air drive motor is operatively driven by said pneumatic fluid transmitted by said air regulator through said pneumatic fluid conduit such that an output of said first and second metering pumps is based on said regulated amount; and
   means for adjustably mounting at least one of said first and second metering pumps with respect to said air drive motor so as to accommodate different drive means for said at least one of said first and second metering pumps with respect to said air drive motor whereby different amounts of a first one of said first and second components of said two-component mixture, with respect to the second one of said first and second components of said two-component mixture, may be dispensed by said first and second metering pumps wherein said adjustable mounting means comprises a support platform and at least one mounting bracket, upon which said at least one of said first and second metering pumps is mounted, movably mounted upon said support platform.

14. The system as set forth in claim 13, further comprising:
   at least one slot defined within said at least one mounting bracket; and
   at least one fastener disposed within said slot and engaged with said support platform for permitting said at least one mounting bracket to be moved to a selected position when said at least one fastener is disposed in a loosened state with respect to said support platform, and for fixing said at least one mounting bracket at said selected position when said at least one fastener is disposed in a tightened state with respect to said support platform.

15. A two-component mixture dispensing system, comprising:
   a first metering pump for dispensing a first component of a two-component mixture;
   a second metering pump for dispensing a second component of said two-component mixture;
   an air drive motor for driving said first and second metering pumps;
   an air regulator pneumatically connected to said air drive motor by a pneumatic fluid conduit so as to drive said air drive motor by pneumatic fluid transmitted by said air regulator through said pneumatic fluid conduit, said air drive motor operatively connected to said first and second metering pumps so as to, in turn, drive said first and second metering pumps when said air drive motor is operatively driven by said pneumatic fluid transmitted by said air regulator through said pneumatic fluid conduit;
   a pair of axially spaced sprocket members are mounted upon said air drive motor;
   a first sprocket member is mounted upon said first metering pump;
   a second sprocket member is mounted upon said second metering pump; and
   a first drive chain operatively interconnects a first one of said pair of axially spaced sprocket members mounted upon said air drive motor and said first sprocket member mounted upon first metering pump, and a second drive chain operatively interconnects a second one of said pair of axially spaced sprocket members mounted upon said air drive motor and said second sprocket member mounted upon said second metering pump.

16. The system as set forth in claim 15, further comprising:
   means for adjustably mounting at least one of said first and second metering pumps with respect to said air drive motor so as to accommodate different sprocket members for said at least one of said first and second metering pumps with respect to said air drive motor whereby different amounts of a first one of said first and second components of said two-component mixture, with respect to the second one of said first and second components of said two-component mixture, may be dispensed by said first and second metering pumps.

17. A two-component mixture dispensing system, comprising:
   a first metering pump for dispensing a first component of a two-component mixture;
   a second metering pump for dispensing a second component of said two-component mixture;
   an air drive motor for driving said first and second metering pumps;
   means for adjustably mounting at least one of said first and second metering pumps with respect to said air drive motor for said at least one of said first and second metering pumps with respect to said air drive motor whereby different amounts of a first one of said first and second components of said two-component mixture, with respect to the second one of said first and second components of said two-component mixture, may be dispensed by said first and second metering pumps;
   wherein said adjustable mounting means comprises:
      a support platform; and
      at least one mounting bracket, upon which said at least one of said first and second metering pumps is mounted, movably mounted upon said support platform.

18. The system as set forth in claim 17, further comprising:
   at least one slot defined within said at least one mounting bracket; and
   at least one fastener disposed within said slot and engaged with said support platform for permitting said at least one mounting bracket to be moved to a selected position when said at least one fastener is disposed in a loosened state with respect to said support platform, and for fixing said at least one mounting bracket at said selected position when said at least one fastener is disposed in a tightened state with respect to said support platform.

19. A two-component mixture dispensing system, comprising:
   a first metering pump for dispensing a first component of a two-component mixture;

a second metering pump for dispensing a second component of said two-component mixture;

an air drive motor for driving said first and second metering pumps;

means for adjustably mounting at least one of said first and second metering pumps with respect to said air drive motor so as to accommodate different drive means for said at least one of said first and second metering pumps with respect to said drive motor whereby different amounts of a first one of said first and second components of said two-component mixture, with respect to the second one of said first and second components of said two-component mixture, may be dispensed by said first and second metering pumps;

a pair of axially spaced sprocket members are mounted upon said drive motor;

a first sprocket member is mounted upon said first metering pump; and a second sprocket member is mounted upon said second metering pump; and a first drive chain operatively interconnects a first one of said pair of axially spaced sprocket members mounted upon said drive motor, said first sprocket member mounted upon said first metering pump, and a second drive chain operatively interconnects a second one of said pair of axially spaced sprocket members mounted upon said drive motor and said second sprocket member mounted upon said second metering pump.

20. A two-component mixture dispensing system, comprising:

a first metering pump for dispensing a first component of a two-component mixture;

a second metering pump for dispensing a second component of said two-component mixture;

an air drive motor for driving said first and second metering pumps;

an air pressure regulator for controlling a speed of said air drive motor such that an output of said drive motor is adjustable when driving said first and second metering pumps;

means for adjustably mounting at least one of said first and second metering pumps with respect to said drive motor so as to accommodate different drive means for said at least one of said first and second metering pumps with respect to said drive motor whereby different amounts of a first one of said first and second components of said two-component mixture, with respect to the second one of said first and second components of said two-component mixture, may be dispensed by said first and second metering pumps wherein:

said first and second metering pumps are mounted upon opposite lateral sides of said drive motor.

\* \* \* \* \*